(12) United States Patent
Jaidka et al.

(10) Patent No.: US 9,817,893 B2
(45) Date of Patent: Nov. 14, 2017

(54) TRACKING CHANGES IN USER-GENERATED TEXTUAL CONTENT ON SOCIAL MEDIA COMPUTING PLATFORMS

(71) Applicant: Adobe Systems Incorporated, San Jose, CA (US)

(72) Inventors: Kokil Jaidka, Bengaluru (IN); Ponnurangam Kumaraguru, New Delhi (IN); Niyati Chhaya, Bengaluru (IN); Sajal Rustagi, Roorkee (IN); Prakhar Gupta, Roorkee (IN); R. Kaushik, Surathkal (IN)

(73) Assignee: Adobe Systems Incorporated, San Jose, CA (US)

( * ) Notice: Subject to any disclaimer, the term of this patent is extended or adjusted under 35 U.S.C. 154(b) by 298 days.

(21) Appl. No.: 14/625,446

(22) Filed: Feb. 18, 2015

(65) Prior Publication Data
US 2016/0239581 A1    Aug. 18, 2016

(51) Int. Cl.
*G06F 17/30*   (2006.01)

(52) U.S. Cl.
CPC .............................. *G06F 17/30719* (2013.01)

(58) Field of Classification Search
USPC .................................. 707/743, 603, 723, 794
See application file for complete search history.

(56) References Cited

U.S. PATENT DOCUMENTS

| | | | |
|---|---|---|---|
| 8,832,091 B1* | 9/2014 | Bhagat | G06F 17/30958 707/723 |
| 2011/0218960 A1* | 9/2011 | Hatami-Hanza | G06F 17/30 707/603 |
| 2011/0295903 A1* | 12/2011 | Chen | G06F 17/30598 707/794 |
| 2012/0272160 A1* | 10/2012 | Spivack | G06Q 10/10 715/752 |
| 2012/0290649 A1* | 11/2012 | Ramirez | H04L 67/22 709/204 |
| 2015/0106360 A1* | 4/2015 | Cao | G06F 17/30716 707/723 |

* cited by examiner

*Primary Examiner* — Hung T Vy
(74) *Attorney, Agent, or Firm* — Kilpatrick Townsend & Stockton LLP

(57) ABSTRACT

Social media posts related to a topic are analyzed over time by parsing the posts to identify terms and by statistically analyzing occurrences and co-occurrences of the terms in the posts to derive metrics. A relationship-based structure is updated over time based on the metrics. A relationship-based structure is updated over time based on the metrics. In an example, the relationship-based structure includes weighted nodes and edges. The nodes represent terms in the posts and the edges represent co-occurrences of the terms. The weights of the nodes depend on frequencies of the occurrences, while as the weights of the edges depend on frequencies of the co-occurrences. A trend in the social media posts is detected by identifying a change over time in the relationship-based data structure.

20 Claims, 8 Drawing Sheets

TRACKING CHANGES IN USER-GENERATED TEXTUAL CONTENT ON SOCIAL MEDIA COMPUTING PLATFORMS

TECHNICAL FIELD

This disclosure relates generally to techniques and systems for tracking content posted on computer networks and more specifically relates to tracking textual content in discussions on social media computing platforms.

BACKGROUND

Social media platforms are often the most up-to-date platforms for discussing real-world events and current affairs. The content published on social media platforms is frequently updated with new posts, often presenting new content before such content can be published via more traditional channels such as television and newspaper. For example, a social media website may present a published web page with core content and include additional frequently published content in blog posts, comment posts, reply posts, content sharing posts, posted links, and other types of posts. In one specific example, a user at a professional sporting event may post a comment on the result of the event as soon as the event ends, and users both at the event and users elsewhere may quickly respond to the post with reply posts providing supplemental information and commentary. The event triggers a time-delimited topic on social media. The topic is discussed through a number of related stories.

Existing systems track content posted on social media platforms but fail to adequately identify and organize such content for particular topics. Tracking topics is a difficult problem, because it requires tracing the emergence of a topic and its evolution over time, and some related topics may not even have been present at the outset. Furthermore, this would involve rigorous filtering of the social media data with the relevant seed words, and then segregating data relevant to it, over a time period. Existing approaches solve the topic identification problem by generally identifying words and co-occurrences of words, or using clustering techniques to find groups of similar content. That may include, for example, parsing posts and computing how often words occur together in the posts. Posts with frequently co-occurring words are matched to a topic, whereas remaining posts are filtered out. This matching includes matching the frequently co-occurring words to words of a topic from a list of potential topics. When the volume of the matched posts exceeds a certain threshold, the topic is found to be trending. However, because of the lack of a moderator or a filter in such systems, the identified social media data may include old or stale posts and thus irrelevant posts are often identified as related to a topic and stale topics are often erroneously identified as trending. Because topic determinations are based simply on posting volume, existing systems cannot identify how long a topic has persisted, how a topic has changed or evolved over time, why a topic is trending, or detects stories (e.g., subtopics) within a topic and the trend of the stories (e.g., start, end, and relevance).

SUMMARY

One exemplary embodiment relates to detecting a trend in social media posts on one or more social media platforms. The exemplary embodiment involves tracking occurrences of terms in social media posts on the one or more social media platforms. The exemplary embodiment also involves tracking co-occurrences of the terms in the social media posts by identifying terms that occur together in same social media posts. Further, the exemplary embodiment involves updating a relationship-based data structure over time with metrics regarding the occurrences and co-occurrences. The relationship-based data structure includes nodes and edges connecting the nodes. The nodes represent the terms and the edges represent the co-occurrences of the terms. In addition, the nodes and edges are weighted based on the metrics, where weights of the nodes represent frequencies of the occurrences of the terms and weights of the edges represent frequencies of the co-occurrences. The exemplary embodiment also involves detecting the trend in the social media posts on the one or more social media platforms by identifying a change over time in the relationship-based data structure.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
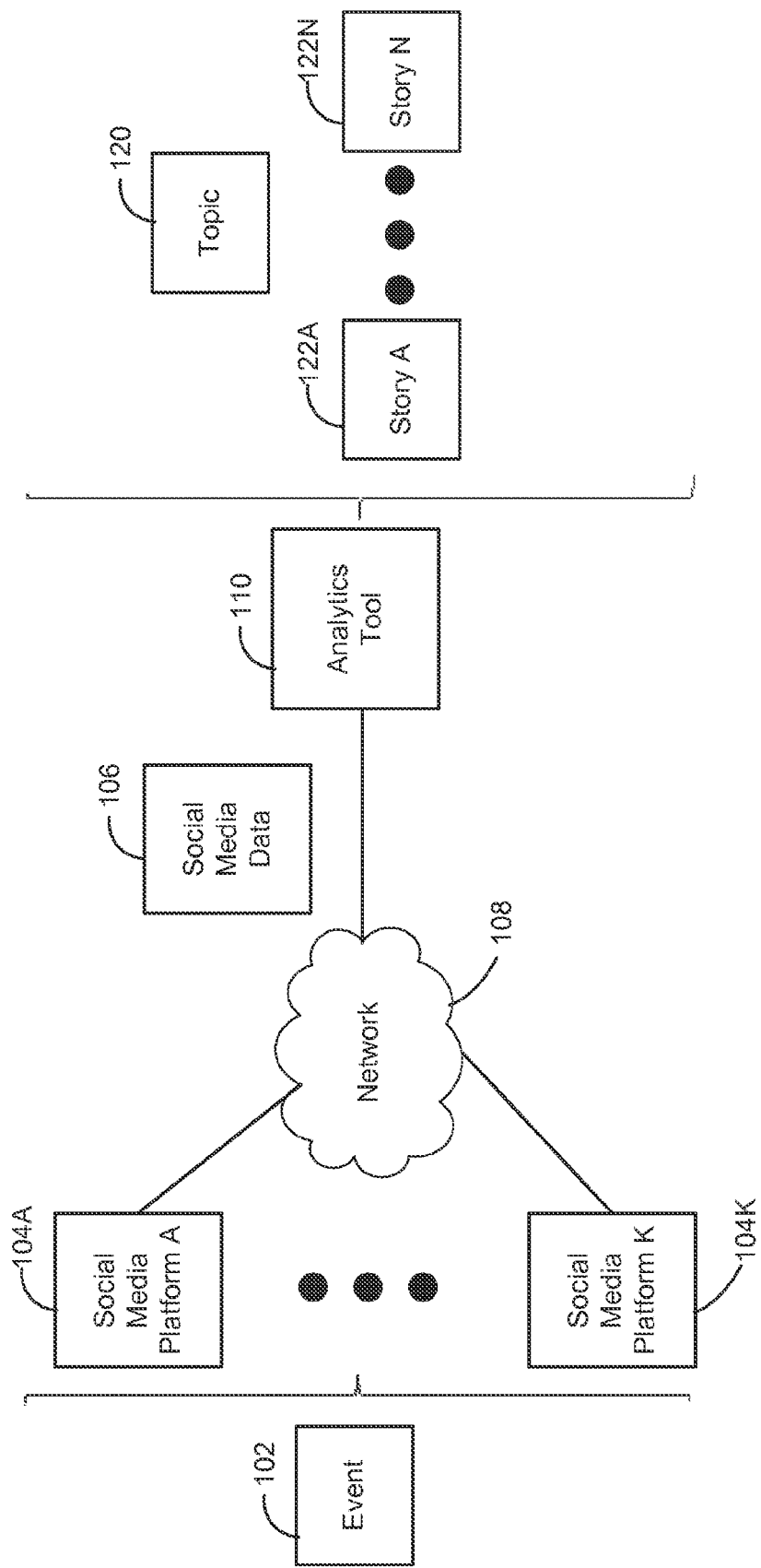
FIG. 1 illustrates an example computing environment for detecting a trend in the discussion on a social media platform, according to certain embodiments of the present invention.

Users discuss an event on social media platforms, generating social media posts about the event. Generally, the event triggers a time-delimited topic on social media. The topic is discussed through a number of related stories. The embodiments described herein are directed to, among other things, identifying topics by identifying related stories in social media, and subsequently monitoring the social media platforms, to find additional stories related to the topic. The monitoring allows the detection of a trend in social media posts on the social media platforms.

As used herein, a "trend" refers to how discussion of a topic changes in posts on the social media platform over time. As used herein, a "social media post" refers to data outputted from a social media platform and representing a discussion. For example, a social media post includes any or a combination of a post at a social media page, a tweet from a social media service, a blog on a website, etc. Detecting a trend can involve detecting that a discussion regarding a particular topic has begun, that discussion regarding the topic has shifted from one story (i.e., subtopic) to another story, that posts regarding a particular story are increasing (or decreasing) in frequency, etc. Generally, the trend detection involves tracking the discussion regarding the topic over a period of time. For example, an increase in the frequency of the terms "curved" and "tablet" and in the frequency of the co-occurrence of both of the these terms in posts during a tradeshow may be used to identify that a curved tablet story is emerging in a discussion about the tradeshow. Trends are detected using a relationship-based data structure to organize metrics that track the occurrences and co-occurrences of terms. Because the relationship-based data structure groups words that are related (based on co-occurrence), it groups metrics related to particular topic discussions, and groups metrics related to particular stories being discussed together within those topic discussions. The groupings thus facilitate identification of topics, stories, and trends. Specifically, the relationship-based data structure is partitioned to identify topics and stories. Trends are then detected by comparing the relationship-based data structure for different time periods to identify changes in the metrics (e.g., word occurrence and co-occurrence frequencies) associated with the identified topics and sub-topics.

As briefly discussed above, the main gap in existing techniques for monitoring and analyzing social media posts is that these tools do not consider the relationship between time and the underlying discussions to track a topic and the associated stories, and do not track the rise and fall of the topic and the stories over time. Said differently, analyzing social media posts for word co-occurrences or to cluster the discussions can identify a trending topic. However, such techniques are insufficient to identify evolutions of the topic and the stories over time. For example, if a topic about an ongoing technology event is trending on a social media platform, existing techniques do not allow an understanding of what stories attendees of the event are discussing, let alone how the general discussion about the event and the individual stories are evolving over time (e.g., the attendees were initially interested in the event organization, then shifted their interest to a new product release, etc.).

To detect growth of a topic and the associated stories in social media, embodiments disclosed herein exploit the textual and time-based properties of social media posts to aggregate related content and identify the stories that are causing the topic to trend. In particular, metrics about occurrences of terms (e.g., a collection of words) in the social media posts and the co-occurrence of those terms with one another are analyzed and stored. Occurrences of a term represent the term occurring in multiple social media posts. A co-occurrence of two terms represents the two terms occurring together in a same social media post. The occurrence and co-occurrence metrics during a particular time period are used to identify that certain terms form a story that discusses an aspect of the topic. Changes in the occurrence and co-occurrence metrics over time are used to identify a trend of the story, e.g., whether an interest in the story is increasing in frequency, decreasing in frequency, or whether there is a shift in the interest resulting in another story trending. Thus and unlike existing techniques, the embodiments disclosed herein identify trends of a topic and associated stories based on changes over time to occurrences and co-occurrences of terms in social media posts.

In an example embodiment, a relationship-based structure is used to identify the stories and to track the changes over time to identify the trends. As used herein, a "relationship-based structure" refers to a data structure for storing information about terms from social media posts, such as relevance of each term and correlations between the terms. In an example, the relationship-based includes a graph data structure (referred to herein as a "graph"). Nodes and edges connecting the nodes form the graph with the connections providing the relationships. A node represents a term found in one or more social media posts. An edge represents co-occurrences of terms in social media posts and thus represents a relationship between the terms. The nodes and the edges are weighted using the occurrence and co-occurrence metrics. In particular, a weight of a node depends on the frequency of occurrence of a corresponding term in the social media posts. The higher the frequency is, the larger the weight of the node is. Similarly, a weight of an edge depends on the frequency of co-occurrence of corresponding terms. The more frequently two terms co-occur, the larger the weight of the edge connecting the corresponding nodes is. As used herein, a "weight" represents a value or a metric that depends on occurrence of a term or a co-occurrence of multiple terms.

In an embodiment, the relationship-based structure is used to detect terms of interest that form stories. A term of interest represents a term that is more commonly used in social media posts and, thus, is relevant to users of social media platforms. Once the terms of interest are detected, the stories and the corresponding trends are identified. Doing so involves multiple steps.

In one step, the relationship-based structure is partitioned to detect the terms of interest and the resulting stories. Partitioning uses the weights of the nodes and edges to identify relevance of the terms and correlations therebetween. In an example, the partitioning uses thresholding. The thresholding is applied to any or a combination of the nodes and edges. For instance, by comparing weights of nodes to a threshold, nodes weighing more than the threshold belong to one partition. Terms corresponding to these nodes are terms of interest because their occurrence frequencies are larger than the threshold (e.g., because they frequently occur in the social media posts). Further, by comparing weights of the edges connecting these nodes to a same or different threshold, edges weighting more than the threshold belong to one partition. The associated terms represent terms of interest that form a same story. That is because the co-occurrence frequencies of these terms are larger than the threshold (e.g., because the terms frequently co-occur in the social media posts). As such, by partitioning the relationship-based structure based on the weights, the stories are identified by detecting co-occurring terms of interest.

In another step, changes to the relationship-based structure are tracked over time to detect trends of stories. In an example, snapshots at time intervals of the relationship-based structure are used to track the changes. For instance, social media posts generated during a time interval are analyzed to generate or update the relationship-based structure. A snapshot of the relationship-based structure is captured at the end of the time interval. Additional social media posts generated during a subsequent time interval are likewise analyzed to update weights or add new nodes and edges to the relationship-based structure. Another snapshot of the relationship-based structure is then captured. By comparing the two snapshots, changes to the weights, nodes, and edges are detected. The trends are detected based on the changes. For instance, if weights of two nodes representing two terms of interest increase, the increase indicates that the two terms and the associated story are becoming more relevant to users. In comparison, if a weight of an edge decreases, the decrease indicates that the terms represented by the connected nodes are no longer part of a same story.

By using a relationship-based structure, stories and their trends can be efficiently identified and tracked over time. In particular, and unlike existing techniques, the relationship-based structure represents a data structure that efficiently stores the necessary information in a manner that allows partitioning and snapshotting. In turn, the partitioning efficiently detects terms of interest that form stories. In comparison, snapshotting efficiently detects changes to the stories and the resulting trends. As such, the embodiments described herein allow a topic to be represented by a relationship-based structure, and the associated stories to be detected from the underlying nodes and edges. Trends of the topic and the stories are detected from the changes over time to the relationship-based structure.

Turning to FIG. 1, that figure illustrates an example embodiment of a computing environment for detecting a growth of a topic discussing an event. Typically, when an event 102 occurs, users turn to a number of social media platforms 104A-K to discuss the event. This results in social media data 106 generated from the input of the users. The social media data 106 is data that represents social media posts on the social media platforms 104A-K. An analytics tool 110 then accesses the social media data 106 over a network 108. The analytics tool 110 identifies a topic 120 from the social media data 106, and detects stories 122A-N that make up that topic. In an example, the analytics tool 110 is configured to analyze textual and time-based properties of social media data 106 as a part of identifying the topic 120 and the stories 122A-N and tracking the respective growths over time. This analysis includes generating a graph, updating tracking changes to the graph over time, and partitioning the graph as further illustrated in the next figures. Each of the components of the computing environment is further described herein next.

In an embodiment, the event 102 represents an online or offline occurrence and can become a hot topic in the online sphere when discussed in traditional or social media. Most events fall somewhere on the spectrum between known, planned events, such as product releases, live events, concerts, elections, to completely unplanned events or unanticipated occurrences, like product crashes, a demo fail, the spread of computer viruses, or malware threats.

A planned event goes live in social media even before it occurs. A movie release, a new product release, a technology summit, a business model change, etc. are examples of planned events. The social chatter about such planned events gives information about what are people expecting from these events, what is being liked or hated, comparisons with rivals, etc. These discussants could be important promoters or social influencers. In such a case, it is important to keep an ear to conversations of the discussants to know where the public opinion is headed. This information also provides an important insight into customer or user expectations and can be helpful in addressing escalating issues, changing product release strategies, marketing strategies, and defining new products.

On the other hand, an unplanned event represents an unexpected event that occurs suddenly. This sudden occurrence typically results in a sudden spike or burst of social media data. Such unplanned events live longer in social media than on traditional channels, as they are debated and discussed in online conversations by those who are affected. In this case, online conversations accurately reflect a company's success at resolving a problem in their product, or appeasing irate customers over a service outage. Further, with such events, the social media data can change every second, and there needs to be a way to stay on top of the latest, most accurate data being pushed through social or even traditional media.

In comparison, the topic 120 represents a discussion about the event 102. For example, the topic 120 includes discussions of the event 102 on the social media platforms 104A-K. However, not all the discussions on the social media platforms 104A-K are necessarily about the event 102. Thus, some of the social media posts are not associated with the topic 120. In an embodiment, the analytics tool 110 or some other computing service interfacing with the analytics tool 110 is configured to filter the social media posts such that remaining posts are about the event 102 and, thus, represent the topic 120. Various techniques are usable to filter the social media posts. One technique includes, for example, parsing words from the social media posts and matching the parsed words to potential words of the topic. Another technique includes, for example, using hash-tags or setting up social media pages specific for discussing the event 102.

In the interest of clarity of explanation, the embodiments described herein illustrate a single topic 120. However, the embodiments are not limited as such. Instead, the analytics tool 110 can monitor and analyze a number of topics using a number of social media data. In particular, the analytics tool 110 can generate a graph per topic. As described hereinabove, filtering is used to assign the data to the respective topic. In an embodiment, this includes multiple stages of filtering. In a first stage, when a graph is to be generated, the associated social media posts are identified by applying the filtering and, accordingly, accessed and analyzed. In a second stage, a graph has already been generated and should be updated over time. As such, new or additional social media posts (e.g., when a new post, tweet, or blog is received) are accessed and analyzed to update the graph. In this stage, the analytics tool 110 assigns the new or additional social media posts to the graph by also applying similar filtering. In addition, if the posts can be assigned to more than one graph based on the filtering (e.g., words from a post matches two topics), the posts are to the graph with which it can get the maximum similarity (e.g., the highest degree of matching).

In an embodiment, a story (e.g., such as any of the stories 124A-N) typically discusses a single aspect of a topic. For example, under the overarching topic of a virus infecting a suite of products, one story reflects the problems faced by users, another story talks about what information was compromised, while a third story discusses the group of people who claim responsibility for the virus. Further, a story may be made up of terms. A term includes, for example, one or more words from the underlying social media posts. Some of the terms can represent entities, where an entity can be an object of interest in the story. For example, entities could be organizations, people, place names, or the names of any other object of importance in the story.

Turning to the social media platforms 104A-K, these platforms represent computer-based tools configured to allow users to create, share, or exchange information in the form of text, images, videos, and other types of multimedia files. In an example, the social media platforms 104A-K include social media web sites, micro-blogging web sites, and other types of web sites, such as FACEBOOK, TWITTER, etc. Typically, the output of the social media platforms 104A-K includes the social media data 106. The volume and pace of such data can vary depending on the type of the event 102 (e.g., planned or unplanned) and can result in a steady large volume, a burst in volume, or a change in volume over time. Although the embodiments herein describe using social media platforms 104A-K, the embodiments may similarly apply to data from more traditional platforms. A difference in this case includes the volume and pace of the data. In particular, with traditional platforms, typically the volume of the data is steady and the data itself is repetitive.

The social media data 106 represents the output from the social media platforms 104A-K, such as posts, tweets, blogs, or other types of social media posts depending on the used social media platform. This output is referred herein as social media posts. When filtering is applied, the social media posts include discussions about the event, and is analyzed to identify the topic 120 and the stories 122A-N. Generally, the social media posts include text, along with other types of data, such as images.

In an embodiment, the analytics tool 110 is configured to analyze the social media data 106 to identify the topic 120 and the stories 122A-K and the respective growths over time. The analytics tool 110 is implemented as a computing service at an end user computer (e.g., a computing device of a social media analyst), as a computing service remotely hosted and accessible to the end user computer, or is integrated in one or more of the social media platforms 104A-K. In an embodiment, the analytics tool 110 implements a relationship-based structure (e.g., a grap, such as the one described in connection with FIG. 3) and flows for using the relationship-based structure, such as the ones described in connection with FIGS. 4-6. Further, the analytics tool provides a user interface, such as a graphical user interface (GUI) for presenting information about the topic 120 and the stories 122A-K. This information is derived from the graph.

Figure 2:
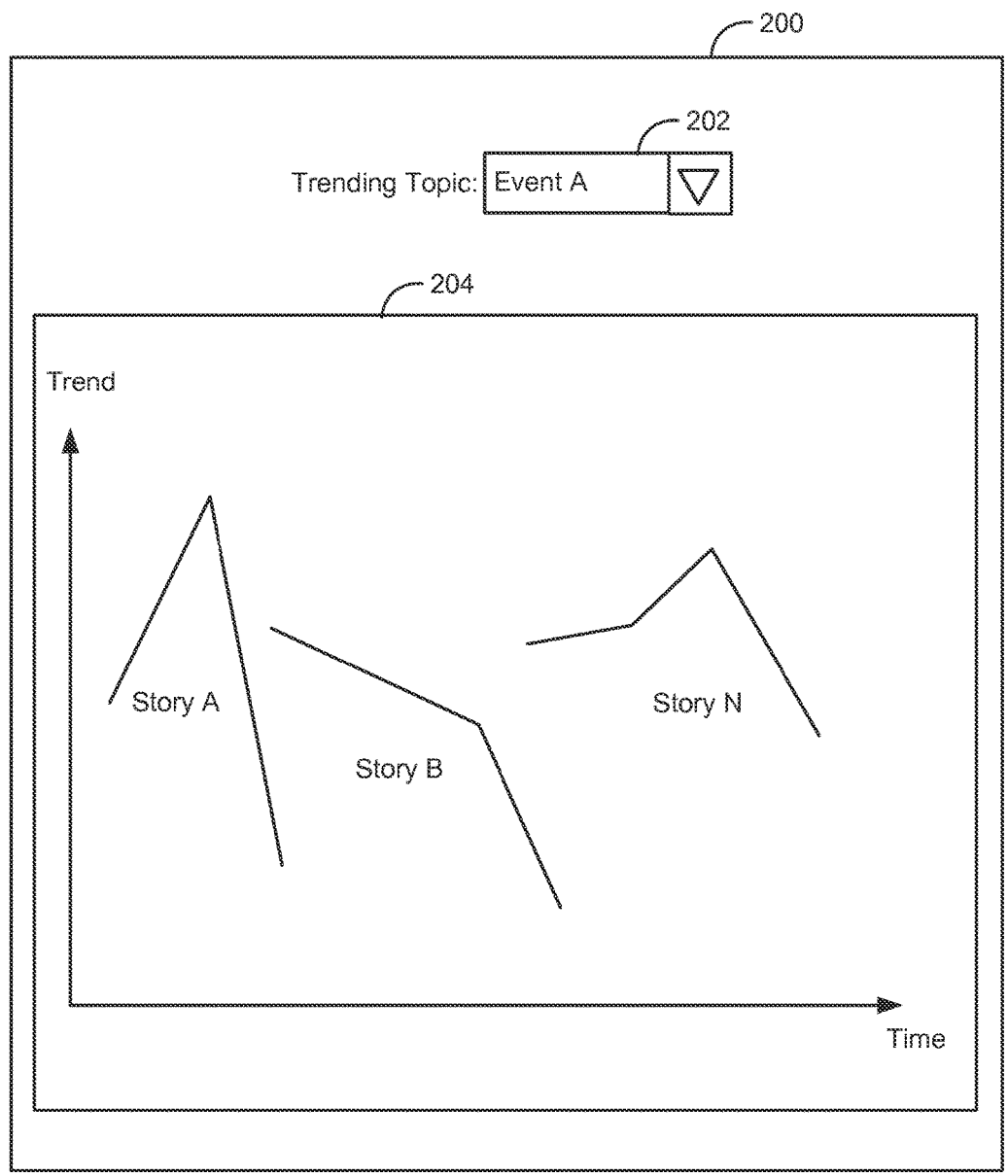
FIG. 2 illustrates an example user interface for presenting information about a topic, according to certain embodiments of the present invention.

Turning to FIG. 2, that figure illustrates an example GUI 200. In an example, the analytics tool 110 provides the GUI 200 such that, when the GUI 200 is presented at an end-user computer, information about a topic and associated stories are also presented. As illustrated, the GUI 200 presents various types of information about a topic. In particular, the GUI 200 identifies a trending topic 202. As described hereinabove, because the analytics tool 110 can analyze multiple topics, the trending topic 202 allows the user to select any of these topics. For example, the trending topic 202 provides a menu selection (e.g., a drop down box) that lists the different trending topics. Once a trending topic is selected, additional information 204 about this topic is presented. Generally, this additional information 204 represents the lifetime of the topic, the stories that make up the topic, and the lifetimes of these stories. In an example, the additional information 204 is presented as trends over time. The trend is based on how relevant a story to users may be (e.g., based on the number of social media posts that contain the story). Hence, by providing the GUI 200, the analytics tool 110 allows an end user to quickly ascertain how a topic and the associated stories are trending over time.

Figure 3:
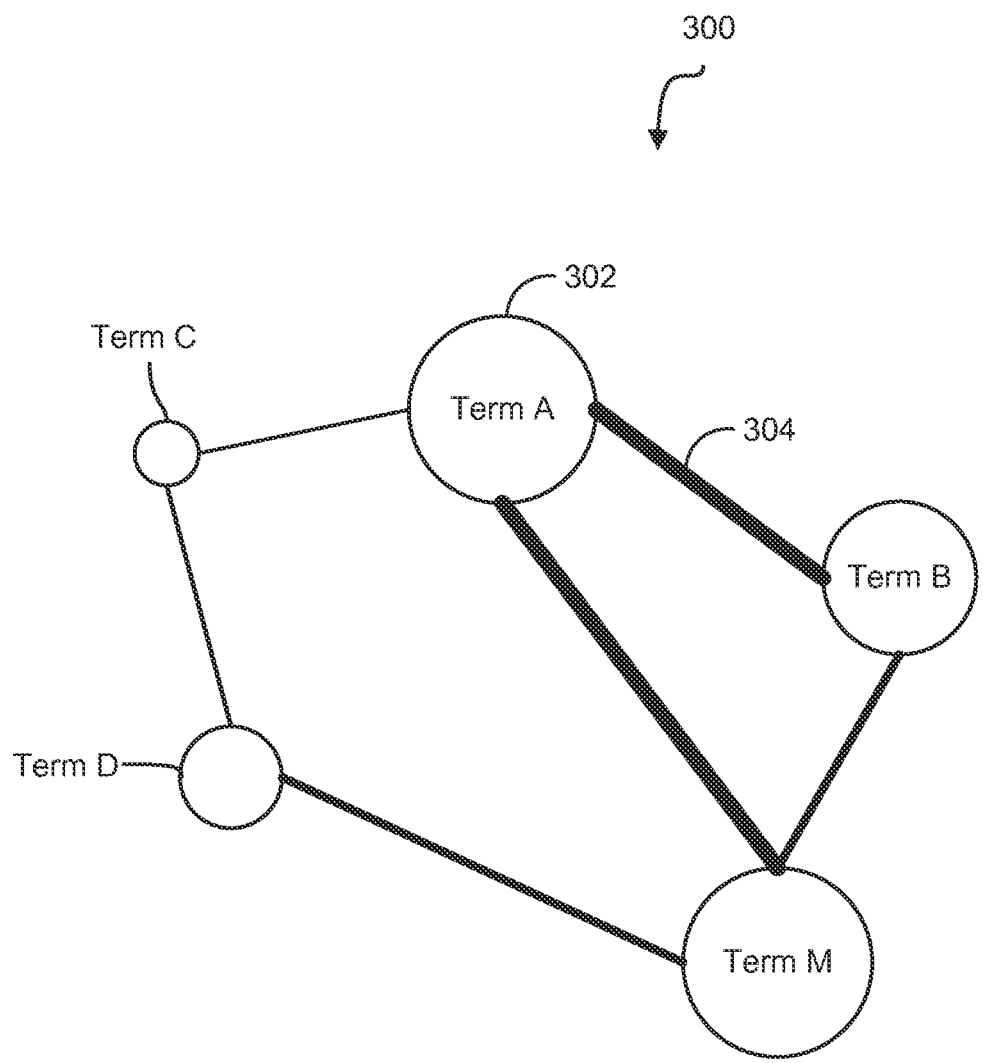
FIG. 3 illustrates an example graph data structure for detecting stories of the topic, according to certain embodiments of the present invention.

Turning to FIG. 3, that figure illustrates an example graph 300. In an example, the analytics tool 110 generates the graph 300 for a particular topic based on social media data associated with that topic (e.g., filtered social media data). In a particular example, the graph 300 is an undirected graph that includes nodes 302 and edges 304. In turn, the nodes and edges are weighted.

In an embodiment, a node 302 represents one or more terms including, for example, one or more entities of a story. The analytics tool 110 identifies the terms by parsing the social media posts. For example, the analytics tool 110 can implement a sentence segmenter, a tokenizer, a part-of-speech tagger to identify the terms and what particular type of speech (e.g., nouns, verbs, etc.) each term may represent. Further, the analytics tool 110 can filter out certain terms of a particular type of speech (e.g., the tool may only retain nouns and remove other types of terms) and/or use a set of rules to create n-grams (e.g., by setting a window of two consecutive words, bigrams may be generated). Once the terms are identified, the analytics tool 110 generates a node 302 for each term (or for each collection of terms depending on the used rules). The weight of the node 302 are computed based on metrics (e.g., occurrence metrics) associated with the corresponding term(s). For example, the weight is calculated by the term frequency values computed from the frequency of occurrence of that term, the number of users who have posted a social media post with the term, and the relevance of the social media post.

In an embodiment, an edge 304 connects two nodes and indicates spatial and/or temporal co-occurrences between the terms corresponding to the two nodes. For example, when two terms represented by two nodes are found together in a social media post, the analytics tools 110 generates an edge 304 that connects these two nodes. Similarly to a node, the edge 304 is also weighted based on metrics (e.g., co-occurrence metrics) associated with corresponding terms. For example, the weight of the edge 304 is calculated by the number of times the two terms occurred together in a same social media post (the term frequency—TF) and the relevance of each individual term in the graph (the Inverse Topic Frequency—ITF).

In an embodiment, once a graph is generated, the analytics tool 110 updates and tracks updates to the graph over time. The update includes updating the weights of the nodes 302 and edges 304 and adding new nodes and edges as applicable. The tracking includes monitoring changes to, for example, the weights over time. By updating the weights, it is possible to determine a relevance of a story at a particular point in time. For example, the weight of a node 302 indicates how relevant that node 302 may be to the topic (e.g., how relevant the corresponding term(s) and associated story are). Similarly, the weight of an edge 304 indicates how relevant the association of the corresponding two nodes may be to the topic (e.g., how relevant the co-occurrences of the corresponding terms and the associated story are). Generally, the greater the weight(s) is, the more relevant the node(s) is. On the other hand, the tracked changes to the weights indicates how the stories and the corresponding topic are evolving over time (e.g., the respective lifetimes, including the rise and fall of stories). For example, an increase in a weight of a node 302 indicates that the corresponding term(s) and associated story are becoming of more interest to users. Similarly, an increase in a weight of an edge 304 may indicate that associated terms are occurring more often together in a story.

In an example, the update of the graph is continuous. In particular, as new social media posts associated with the topic of the graph becomes available, the posts are further analyzed to update the terms and the metrics of the terms and, accordingly, update the graph. In another example, the update is at discrete time intervals. In other words, rather than continuously updating the graph, snapshots of the graph are captured at time intervals. The time intervals can be set as a function of the volume of the social media data. The larger the volume is, the shorter the time intervals becomes (e.g., between one and two hours). Conversely, the smaller the volume is, the longer the time intervals becomes (e.g., between two and six hours).

In an embodiment, capturing a snapshot at a particular point in time (e.g., when the time interval elapses) includes storing the graph in its state at that particular point in time and storing additional information associated with the graph. The additional information includes any of the metrics of the terms and/or the weights of the nodes 302 and the edges 304 at that particular point in time and other information, such as number of social media posts received and analyzed since the last snapshot. As such, the graph and the additional information are stored with a timestamp of the particular point in time. Because this data (the graph, metrics, weights, etc.) is tracked and maintained over time, the analytics tool 110 can detect a rise and fall of stories and the topic over time by analyzing how the data changes between snapshots. A similar approach is also available for use with the continuous monitoring, where the changes to the data is monitored and detected over continuous periods of time rather than at discrete intervals. Example flows for generating, updating, and tracking changes to the graph are further illustrated in FIGS. 4-6.

In an embodiment, depending on the type of the event, the analytics tool 110 generates the graph or a portion of the graph based on a prediction of nodes 302, edges 304, and weights. For example, if the event is a recurring event, there can be an expectation that future recurrences lead to similar stories and story dynamics, especially when not much change is planned from one event to the next. As such, a machine learning classifier can be used. For example, the analytics tool 110 integrates or interfaces with such a classifier. The machine learning classifier is trained with graphs and social media posts of past events and, accordingly, is configured to predict a graph or a portion of a graph for a next or future event.

Figure 4:
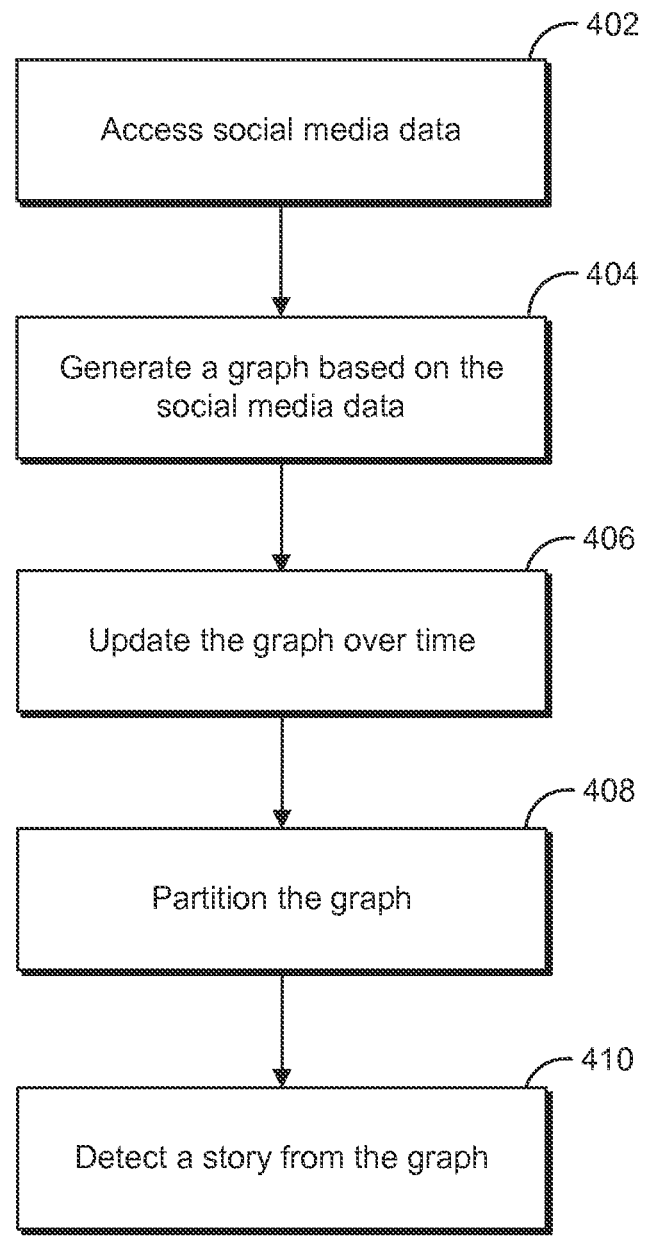
FIG. 4 illustrates an example flow for generating a graph and using the graph to detect the stories, according to certain embodiments of the present invention.
Figure 5:
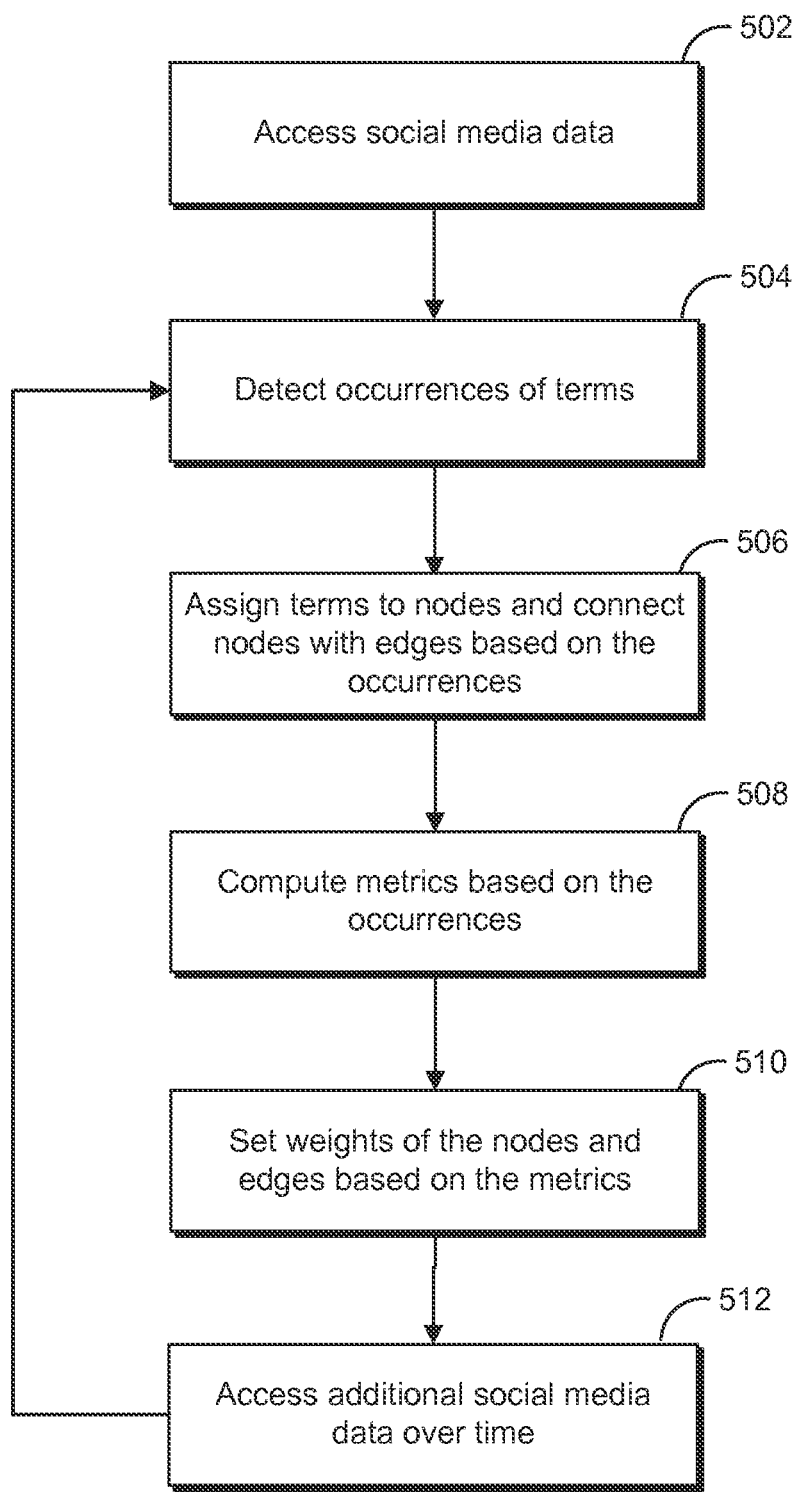
FIG. 5 illustrates an example flow for generating a graph, according to certain embodiments of the present invention.
Figure 6:
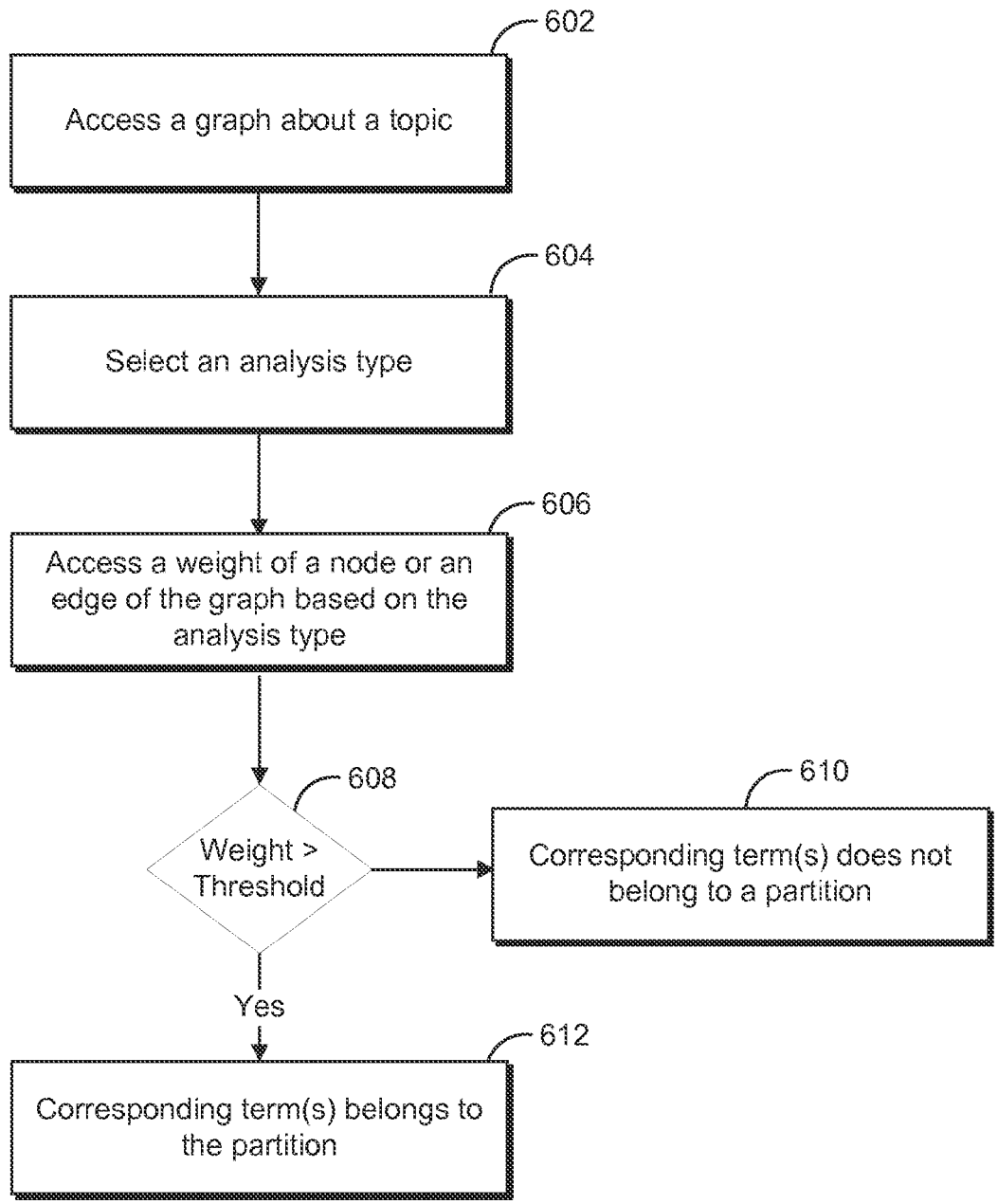
FIG. 6 illustrates an example flow for partitioning a graph to detect stories, according to certain embodiments of the present invention.

Turning to FIGS. 4-6, those figures illustrate example flows for detecting a lifetime of a topic based on a graph. In particular, FIG. 4 illustrates an example flow for generating a graph for a topic and detecting stories from the graph. In comparison, FIG. 5 illustrates a more detailed example flow for generating the graph, while FIG. 6 illustrates a more detailed example flow for detecting the stories. As such, some of the operations between the example flows of FIGS. 4-6 may be similar. In the interest of clarity of explanation, such similarities are not repeated herein.

In the illustrative operations, each of the operations or functions can be embodied in, and fully or partially automated by, modules executed by one or more processors of a computing device. These modules can be implemented as part of, for example, the analytics tool 110. An example computing device implementing such modules is further illustrated in FIG. 8. Additionally, while the operations are illustrated in a particular order, it should be understood that no particular order is necessary and that one or more operations may be omitted, skipped, and/or reordered.

Turning to FIG. 4, the example flow starts at operation 402, where an analytics tool, such as the analytics tool 110, accesses social media data associated with a topic. In an example, accessing the data includes receiving pre-filtered social media data that matches the topic. In another example, accessing the data includes receiving social media data and then pre-filtering the received data to match the topic. The social media data includes social media posts such as posts, tweets, blogs, etc. In turn, such posts include text and other types of data. Further, accessing the social media data is time-based. For example, the analytics tool accesses the social media data at the beginning or the end of a time interval or in between two time intervals.

At operation 404, the analytics tool generates a graph based on the social media data. In an example, the analytics tool parses the text from the social media data to detect terms and applies a set of rules to remove some of the terms (e.g., a set of rules that remove terms other than nouns and that groups terms as applicable to generate n-grams). For each term (or grouped terms), the analytics tool generates a node. For each two terms (or two groups of terms) co-occurring in the same social media post (e.g., in the same post, tweet, blog, etc.), the analytics tool connects the corresponding nodes with an edge. Further, the analytics tool computes metrics of the terms based on a statistical analysis of occurrences of the terms (e.g., frequency of occurrences, frequency of co-occurrences, etc.). Based on the metrics, the analytics tool weighs the nodes and the edges. As such, once the graph is generated, the graph would contain weighted nodes and edges representing how frequently terms occur individually and in pairs in the social media posts.

At operation 406, the analytics tool updates the graph over time. In an example, the update is continuous. In another example, the update is at time intervals. In both examples, the update includes accessing additional or new social media data, analyzing that data as in operation 404, generating new nodes and edges as applicable, updating the metrics of the terms, and updating the weights of the nodes and edges. Further, the update includes tracking changes to the graph over time. For example, the analytics tool stores a snapshot of the graph and additional data, such as the volume of the analyzed social media data (e.g., the number of posts, tweets, blogs, etc.), some or all of the metrics of the terms, and an associated timestamp (e.g., the actual date and time if the update is continuous, or the time interval if the update is at time intervals).

At operation 408, the analytics tool partitions the graph. The partitioning identifies the relevant nodes and edges in the graph. In an example, the partitioning is based on the weights of the nodes. This type of partitioning indicates temporal correlations between the nodes by identifying nodes of similar weights and, thus, of similar number of occurrences within a time interval. In another example, the partitioning is based on the weights of the edges. This other type of partitioning indicates co-occurrence correlations between the nodes by identifying nodes connected with edges of similar weights and, thus, the nodes that tend to occur together. In yet another example, the partitioning is based on both types of weights. Accordingly, this type of partitioning indicates temporal and co-occurrence correlations of the nodes.

In an embodiment, to partition based on weights of nodes, edges, or both, the analytics tool removes nodes and/or edges having weights below a certain threshold and retains remaining nodes and/or edges having weights greater than the threshold. In this example, the threshold is predefined based on empirical data or is computed based on the average or a percentile of the weight of the nodes. In another example, the analytics tool groups the nodes and/or edges in partitions based on ranges of weights. Said differently, a node and/or an edge having a particular weight is assigned to a particular partition having a range of weights that includes the particular weight.

Partitioning the graph depends on the type of analysis (e.g., whether temporal or co-occurrence) and can include a number of sub-operations, some of which vary between the two types of analysis. To illustrate, consider a first example of a temporal correlation analysis that uses snapshots of the graph. In this example, the sub-operations include taking snapshots of the graph at time intervals, updating the graph based on additional social media data accessed between the time intervals, computing or retrieving frequencies of occurrences of the terms between the time intervals, generating, as a function of the time intervals, similarities between the terms based on the frequencies of occurrences, and assigning the nodes to the partitions based on the similarities between the terms. In another illustration, consider a second example of a co-occurrence correlation analysis that also uses snapshots of the graph. In this example, the sub-operations include taking snapshots of the graph at time intervals, updating the graph based on additional social media data accessed between the time intervals, where the update includes increasing or decreasing weights of edges based on co-occurrences of corresponding terms, and assigning nodes to the partitions based on the weights of edges.

At operation 410, the analytics tool detects a story from the graph. The story is made up of one or more terms represented by one or more nodes in the graph. In the interest of clarity of explanation, consider a story made up of two terms represented by two nodes that are connected by an edge. Detecting such a story includes identifying the nodes and the edges and detecting a trend of the story includes identifying changes to the nodes and the edge over time. In turn, identifying the nodes and the edge is based on the partitioning, while identifying the changes is based on the updates to the graph.

In an example, to identify the nodes and the edge, the analytics tool considers the partitioning. If there is a temporal correlation and/or a co-occurrence correlation between the nodes, the analytics tool determines that the terms belong to the same story. As such, if the nodes have similar weights (e.g., belong to the same partition) or if the edge is of a certain weight (e.g., the co-occurrence is large enough), the terms belong to the same story. How relevant or of interest that story may be to users depends on the weights. Said differently, if the weights of the nodes and/or of the edge are large (e.g., belong to a partition with the highest weights), the terms are relevant to users. Conversely, if the weights are small (e.g., the nodes and/or edge can be removed by applying the threshold or belong to a partition with the lowest weights), the terms are of less relevance to users.

On the other hand, to identify the changes, the analytics tool considers the updates to the graph over time. If the weights of the two nodes increase over time, the analytics tool determines that the terms and, correspondingly, the story are becoming more relevant to users. When the weights exceed a threshold, the analytics tool detects a start of the story. Conversely, if the weights decrease, the terms and the story are becoming less relevant. When the weights fall below a threshold, the analytics tools detects an end to the story. Similarly, if the weight of the edge increases over time, the analytics tool determines that users are using the terms more often together and, thus, the terms are becoming more relevant to the story. Conversely, if the weight decreases, the terms are less used together. Thus, the terms are becoming less relevant up to a point where, if the weight falls below a threshold, the terms are no longer part of the same story.

Hence by generating, updating, and partitioning the graph for a topic, the analytics tool identifies a story discussing an aspect of the topic and how that story evolves (e.g., start, end, and relevance) over time. The graph represents a structure for storing the metrics of the terms and for analyzing the metrics to determine how the story is trending. In other words, if the metrics of the story terms (or the associated weights of nodes and edges) are increasing over time, the increase indicates that the story is trending. Conversely, the metrics (or weights) decreasing and falling below a threshold indicates that the story is losing interest with users. Further, if an additional term not previously present in the story connects to at least one of the existing story terms (e.g., a weight of an edge connecting a node of the additional term to a node of an existing story term increases beyond a threshold), that indicates that the story is expanding to include the additional term. Similarly, some existing terms are removed from the story when the weights of the corresponding edge or nodes diminish over time.

Although the example flow illustrates detecting a single story, this flow can be similarly applied to detect a number of stories related to the topic. For example, the analytics tool detects the stories based on the partitioning. To illustrate, two terms represented by two nodes connected by an edge of a large weight belong to one story. In comparison, three terms represented by three nodes connected by two edges of large weights and unconnected to the other two nodes (or if connected, the corresponding weight(s) of the connecting edge(s) is small) belong to another story.

Turning to FIG. 5, that figure illustrates a similar, but more detailed example flow, for generating a graph for a topic. The example flow starts at operation 502, where an analytics tools, such as the analytics tool 110, accesses social media data. At operation 504, the analytics tool detects occurrences of the terms in the social media data. For example, the analytics tool parses the social media data to identify the terms and computes how frequently terms are found individually in the social media data and how frequently pairs of terms are found together in a social media post.

At operation 506, the analytics tool assigns terms to nodes and connects nodes with edges based on the occurrences. The assignment includes labeling the nodes with the assigned terms or maintaining a structure that stores the assignments (e.g., a table listing the nodes in one column and the corresponding terms in another column). For example, if a term does not already have a node, the analytics tool generates that node and assigns the term to the node. If a node already exists, the analytics tool need not further assign the term, but updates metrics of the term and the weights of the node and edge, as applicable, as further illustrated in the next operations.

At operation 508, the analytics tool computes metrics based on the occurrences. In an example, the computation includes a statistical analysis of the occurrences. For a term, the metrics include a frequency of occurrence of the term and a frequency of co-occurrence of the term with another term in the social media data. The metrics can further include the volume of the social media data (e.g., the number of social media posts) and relevance of the individual social media posts. In an example, relevance of a particular social media post is computed from the filtering of the social media data. In other words, when the social media data is filtered to match the topic, the relevance is determined from how well the particular social media post matches the topic.

At operation 510, the analytics tool sets weights of the nodes and edges based on the metrics. Generally, a weight of a node indicates how relevant or of interest the corresponding term may be to users. In an example, the larger the weight is, the more relevant the term is. That is because the frequency of occurrence of the term is higher, indicating that a larger number of users is using the term in social media posts. Similarly, a weight of an edge connecting two nodes representing two terms indicates how relevant the co-occurrence of the terms is to users. For example, the larger the weight is, the more relevant the co-occurrence is. That is because the frequency of co-occurrence is higher, indicating that a larger number of users is using the two terms concurrently in social media posts.

In an example, a weight of a node representing a term is computed as a function of the frequency of occurrence of that term, the number of users who have posted a social media post with the term, and the relevance of the social media post. In another example, the weight of an edge connecting two nodes representing two terms is computed as a function of the frequency of co-occurrence of the two terms in a social media post and the inverse frequency of occurrence of each term.

At operation 512, the analytics tool accesses additional social media data over time. The access is continuous or at discrete time intervals, where the additional social data represents new data (e.g., recently generated social media posts) that has not been analyzed yet. The analytics tool further analyzes the additional data by repeating operations 504-510. This iterative process allows the analytics tool to update and track changes to the graph over time.

Turning to FIG. 6, that figure illustrates an example flow for partitioning an already-generated graph. The partitioning at least allows identification of stories and their relevancies. In particular, during an event, the frequency of social media posts about the event typically increases, resulting in multiple scenarios based on the type of the event. In the case of an unexpected event, a new topic is created related to the event. For example, when a new software virus is detected, a topic related to the virus is generated. On the other hand, in the case of a planned event, the usage of a set of terms only related to the specific event increases. For example, when a new version of software is released according to a planned release, then in the topic around the software, the frequency of related terms increases. The weights of edges between nodes of these terms also increase. Several stories are discussed which are relevant to the same event. It is also possible that the same event occurs periodically. In all cases, the frequency of relevant terms and the co-occurrences between those terms increases. By partitioning the graph either along time or co-occurrence lines, the relevance and freshness of a story is established.

Further, when an event ends, multiple scenarios are possible. For example, existing stories that discussed the event show a dip in activity, but continue to be discussed in some fashion if the constituting terms are still of interest to the general public for different reasons. In another example, stories discussing the event die out altogether if none of the constituting terms are discussed anymore. In both examples, the frequency of certain terms falls drastically. Other terms take their place, resulting in new edges and term correlations. Although the new terms may be few in number, these terms would still represent the most recent information than the erstwhile strongest edges. Finally, if the event is a repeating event, prior knowledge of the event helps to train a machine learning classifier to predict some patterns, such as potential co-occurring terms, number of users or expected frequency and popularity, and so on.

The example flow of FIG. 6 starts at operation 602, where an analytics tool, such as the analytics tool 110, accesses a graph about a topic. For example, the analytics tool accesses the graph from memory or receives the graph from a remote computing device.

At operation 604, the analytics tool selects an analysis type. In an example, the selection is automatic. In another example, the selection is user-based where the analytics tool provides an interface (e.g., a GUI) for a user to make the selection. The selection indicates whether a temporal correlation analysis, a co-occurrence correlation analysis, or both types of analyses are desired. Depending on the selected analysis, different analytics parameters are used. Example analytics parameters specific to each analysis type are further described herein below. However, before describing these parameters and their use, the remaining operations of the example flow are described with overarching analytics parameters: weights from the graph. As further described following the operations of the example flow, each analysis type is further refined by using specific analytics parameters associated with the weights.

At operation 606, the analytics tool accesses a weight of a node or an edge of the graph based on the type. For example, if a temporal correlation analysis is desired, the analytics tool accesses a weight of a node. In comparison, if a temporal correlation analysis is desired, the analytics tool accesses a weight of an edge. If both analyses are desired, the analytics tool accesses weights of a node and of an edge. The access includes retrieving from the graph (or a snapshot of the graph) the weight(s).

At operation 608, the analytics tool compares the weight (s) to a threshold. The threshold is derived from empirical data or is computed based on the average or a percentile of the weights in the graph. If the weight(s) exceeds the threshold, operation 610 is followed, where the analytics tool determines that the corresponding term(s) does not belong to a partition. Otherwise, operation 612 is followed, where analytics tool determines that the corresponding term (s) belongs to the partition. By allocating term(s) to the partition, the analytics tool detects what terms belong to a same story. For example, the partition includes terms of the same story.

As described hereinabove, the partitioning of the graph depends on the type of the analysis. The next sections describe example partitioning and analytics parameters based on each of the temporal correlation and co-occurrence correlation analyses.

In a temporal correlation, it is desired to partition all terms in a graph so that the terms belonging to one partition are temporally related in their usage. Such terms are related to a single event. Terms are inferred to be related if their usages have similarity over time. To compute the similarity, a frequency of a term $k_i$ over a particular time unit t is used and defined as:

$$F_{k_i,t} = \frac{count_t(k_i)}{\sum_{j=1}^{N}(count_t(k_j))},$$

where $K=(k_1, k_2, \ldots, k_n)$ is the set of all terms and $count_t(ki)$ is the number of occurrences of $k_i$ for the time duration t. Further, the temporal correlation between two terms $k_1$ and $k_2$ over a span of time units $T=(t_1, t_2, \ldots, t_n)$ is calculated by the standard correlation coefficient of the frequencies of $k_1$ and $k_2$ for this time range. This value lies between (0, 1), where larger values indicate stronger correlation. In an example, the minimum time unit is set to be equal to one hour duration (e.g., $t_1-t_2=60$ minutes) or some other duration.

The frequency function of a term k over b time units is the b dimensional vector $[F_k=(f_{k,1}, f_{k,2}, \ldots, f_{k,b})]$. The similarity of two terms is defined as the correlation coefficient of the corresponding frequency functions. For a particular term k, let $F_{k,t}$ be its frequency function, $\mu(F_k)$ be its mean frequency, and $\sigma(F_k)$ be the standard deviation of its frequency.

The similarity of two terms $k_1$ and $k_2$ is the correlation coefficient of their frequency functions given as $$sim(k_1, k_2, b) = \frac{1}{b}\Sigma_t \frac{F_{k_1,t}-\mu(F_{k_1})}{\Sigma_t F_{k_1}} \frac{F_{k_2,t}-\mu(F_{k_2})}{\Sigma_t F_{k_2}}.$$

Here, the frequency function of a term is normalized to prevent the artificial correlation when the occurrences of all terms are high, such as on a weekend. After each b time slot, the correlation values between every pair of terms is computed and added to a two-dimensional matrix M. The algorithm with the pseudo-code below is used to generate the partitions. The output of the algorithm includes a set of lists or partitions, where all terms in a list will have a same temporal nature.

```
1: procedure CANOPY-CLUSTERING
2: for all entity k [1,n] do
3:     Add k to similarity list of k
4:     for all entity j [1 k,n] do
5:         if sim(k,j,b) > threshold then
6:             Add j to similarity list of k
7:             Remove j from original list
```

In a co-occurrence correlation analysis, snapshots of a graph are analyzed at time intervals. To complete this analysis, the following operations are performed. A graph with co-occurrence for every pair of terms for each social media post is maintained. The graph can be stored with a timestamp after a given time interval. This time interval can be dynamically adjusted or manually set according to the kind of event being monitored or the volume of the social media data being observed. For each pair of terms, pairs that are not updated for some time are removed. Additionally, or alternatively, a decay rate is used to remove such pairs. Thereafter, the graph is represented into a weight matrix W where $W_{ij}$ is set to n, if there are n social media posts that contain both the terms i and j. Based on this matrix, partitions of terms that have high co-occurrence counts are found. Because the graph can be huge and complex, the graph's complexity is reduced without information loss by, for example, using top k neighbors. After each time interval, a decay function is used to recalculate co-occurrence values between pairs of entities. To find the partitions, the top k neighbors are set to 1 and others to 0, where the top k neighbors are chosen according to their co-occurrence values. Finally, groups of top k neighbors in the graph are detected to find the partitions.

Another approach to the co-occurrence correlation analysis is based on weights of edges. This approach includes using, after every time interval, a decay function to recalculate co-occurrence values between pairs of terms. To find the partitions, all edges with weights less than some value or threshold are set to 0. The partitions are found from the remaining edges.

Yet another approach to the co-occurrence correlation analysis is to use k-core algorithm. This algorithm outputs groups of vertices that are connected to at least k others. Vertices of out-degree less than k are removed repeatedly. The partitions are found from the remaining vertices.

Figure 7:
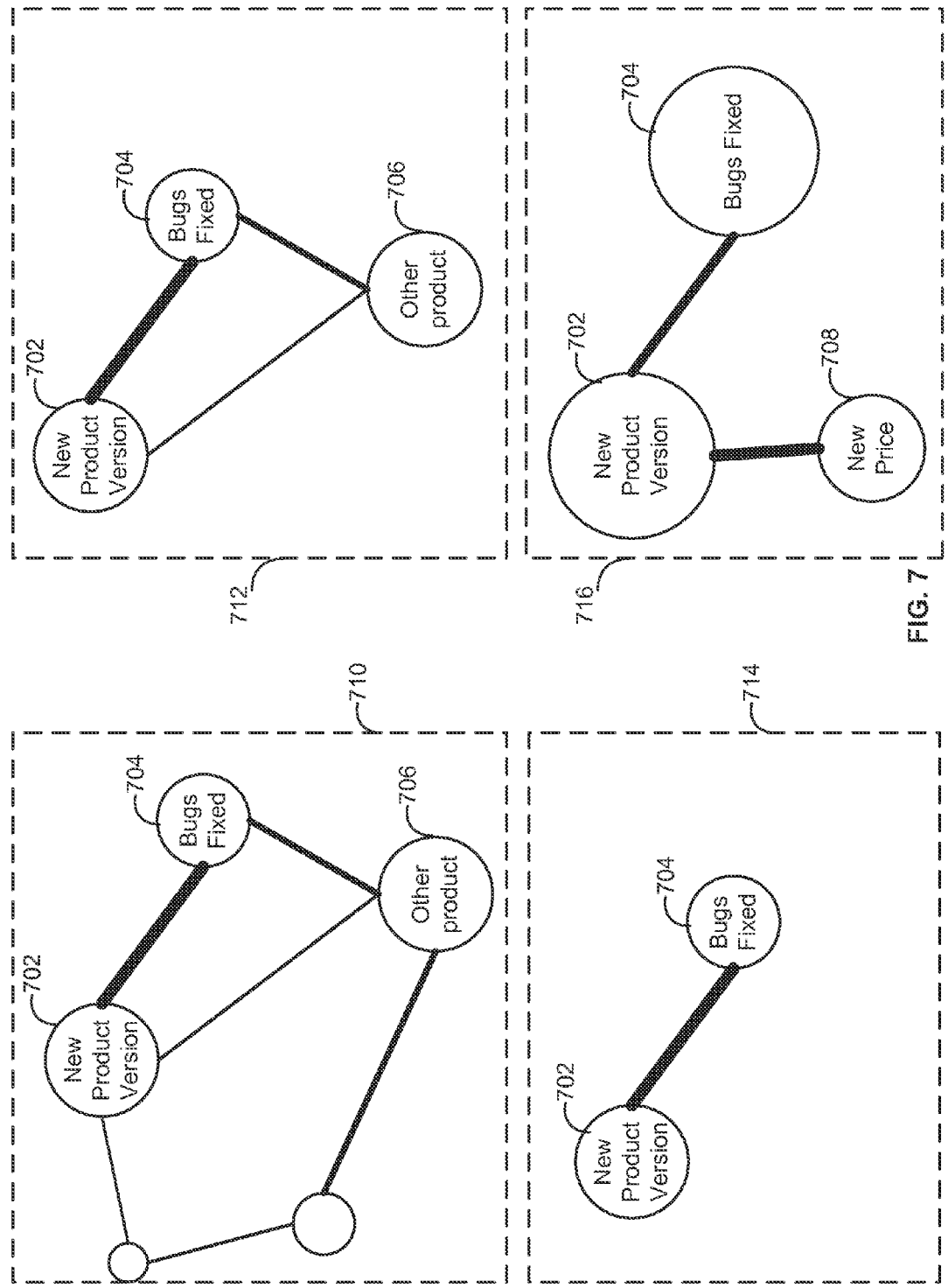
FIG. 7 illustrates an example of detecting a story and an associated trend based on partitioning and snapshotting, according to certain embodiments of the present invention.

Turning to FIG. 7, that figure illustrates an example of partitioning and snapshotting a graph to detect a story and an associated trend. As illustrated, a graph 710 is generated. The graph includes multiple nodes and connecting edges that are weighted. For example, the graph includes a node 702 representing the term "new product version," a node 704 representing the term "bugs fixed," a node 706 representing the term "other product," along with a number of other nodes. Partitioning the graph along the weights of the nodes results in a partition 712. For example, by thresholding the node weights, nodes 702-706 are retained while the remaining nodes are removed. As illustrated in FIG. 7, these three nodes have large weights and, thus, correspond to terms of interest to users. These terms of interest can form one or more stories that include "new product releases, bugs fixed, other product." By partitioning the remaining nodes 702-706 along the weights of the edges, another partition 714 is generated. As illustrated in the partition 714, the node 706 ("other product") is removed because the edges that connect it to the two other nodes 702 and 704 have small weights falling below a threshold. In comparison, the nodes 702 and 704 are retained because the edge therebetween has a large weight, indicating that the "new product release" and the "bugs fixed" co-occur in social media posts. Thus, a story that includes "new product version, bugs fixed" is identified from the partition 714 indicating that the users are discussing bug fixes that the new product version provides.

The snapshotting of the graph 710 is illustrated in part by the partition 716. In particular, at a time interval, the graph 710 is updated and snapshotted. The updated graph is partitioned along the weights of the nodes and the edges, as discussed herein above in connection with partitions 712 and 714, resulting in the partition 716. By comparing the partition 716 to the partition 714, it is shown that the weights of the nodes 702 and 704 ("new product version" and "bugs fixed," respectively) have increased. That indicates that the two terms are being discussed more frequently with the users and, thus, the story is trending. In addition, it is shown that a new node 708 representing the term "new price" 708 is added and is connected to the node 702. That indicates that the term "new price" is also of interest and being discussed by the users and, thus, the story is expanding to also include a discussion about the price of the new product version.

Figure 8:
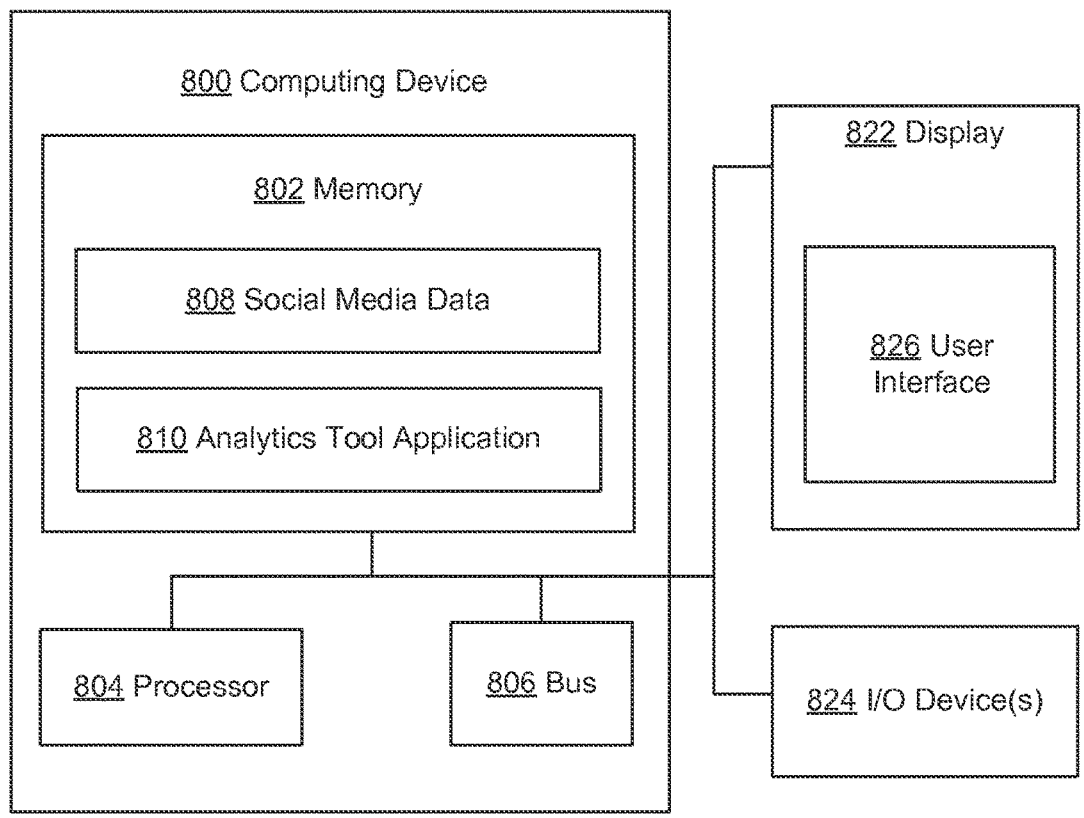
FIG. 8 illustrates an example computing device, according to certain embodiments of the present invention.

Turning to FIG. 8, that figure illustrates an example computing device 800 that can be configured to implement an analytics tool, described hereinabove. The computing device 800 can, for example, access social media data related to a topic and generate, update, and partition a track to identify stories and the corresponding lifetimes.

As used herein, the term "computing device" refers to any computing or other electronic equipment that executes instructions and includes any type of processor-based equipment that operates an operating system or otherwise executes instructions. A computing device will typically include a processor that executes program instructions and may include external or internal components such as a mouse, a CD-ROM, DVD, a keyboard, a display, or other input or output equipment. The example computing device 800 can be used as special purpose computing devices to provide specific functionality offered by hosted applications and by the interaction between these hosted applications. As an example, the computing device 800 is shown with a display 822 and various input/output devices 824. An example input/output device 824 includes a receiver or a network interface for receiving information, such as social media data, from another computing device in a peer-to-peer configuration or over a network. A bus, such as bus 806, will typically be included in the computing device 800 as well.

In an embodiment, to implement the analytics tools, the computing device 800 includes an analytics tool application 810. This application may implement the various, functions, features, and operations described hereinabove. As used herein, the term "application" refers to any program instructions or other functional components that execute on a computing device. An application may reside in the memory of a computing device that executes the application. As is known to one of skill in the art, such applications may reside in any suitable computer-readable medium and execute on any suitable processor. For example, as shown, the computing device 800 has a computer-readable medium such as memory 802 coupled to a processor 804 that executes computer-executable program instructions and/or accesses stored information. The processor 804 may include a microprocessor, an ASIC, a state machine, or other processor, and can be any of a number of computer processors. Such processors include, or may be in communication with, a computer-readable medium which stores instructions that, when executed by the processor, cause the processor to perform the operations described herein.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The analytics tool application 810 can be configured to analyze social media data to generate, update, and partition a graph and identify stories and their lifetimes over time. Some or all of the social media data can be stored in the memory 802 as social media data 808. Outputs of the application, such as the graph, the stories, etc., can also be stored in the memory 802.

To facilitate interactions with a user, the computing device 800 may support a user interface 826. The user interface can be displayed to the user on the display 822 connected to the computing device 800. By operating the I/O devices 824 (e.g., a keyboard and a mouse), the user interacts with, for example, the analytics tool application 810.

Hence, by using a relationship-based approach and by tracking changes to the graph over time, the embodiments disclosed herein can detect growth of a topic in social media. Such embodiments allow an operator to find answers to questions, such as what are the current user discussions about, what changed in the user discussions in the last hour, or other questions. Further, unlike the existing analytics tools, the embodiments also allow the operator to automatically detect relevant stories in user-generated content and separate these stories from unrelated data (e.g., noise such as posts or tweets about an aspect of a topic that may be of low relevance to users). This story-level detection can be particularly difficult in the following three scenarios: (1) where the volume of incoming data does not change much, so the story is not exactly trending, but may still be important; (2) where the volume of incoming data about a topic is very high for a short period of time, and the relevant information may be a small fraction of the overall topic; and (3) where the volume of incoming data dramatically changes during the time period being considered, and consequently, some stories are no longer being discussed. The timely nature of streaming social media data implies that topics and stories have a short lifespan in which they may be fresh or may be relevant, after which stories may decay and the topic may digress in a different direction. The relationship-based approach allows the detection of the stories in any or all of these scenarios and in other scenarios too.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying," or the like, refer to actions or processes of a computing device, such as one or more computers or a similar electronic computing device or devices, that manipulate or transform data represented as physical, electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

Specific details of various exemplary embodiments of the present invention are set forth in the following description and are illustrated in FIGS. 1-8. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

The invention claimed is:

1. In a network-based environment for analyzing social media data, a computer-implemented method performed on a computer for detecting a trend in social media posts on one or more social media platforms, the computer-implemented method comprising:
    tracking occurrences of terms in the social media posts on the one or more social media platforms;
    tracking co-occurrences of the terms in the social media posts by identifying terms that occur together in same social media posts;
    updating a relationship-based data structure over time with metrics regarding the occurrences and co-occurrences, the relationship-based data structure comprising nodes and edges connecting the nodes, the nodes representing the terms, the edges representing the co-occurrences of the terms, the nodes and edges weighted based on the metrics, weights of the nodes being proportional to frequencies of the occurrences of the terms, and weights of the edges being proportional to frequencies of the co-occurrences;
    identifying a first term of interest represented by a first node in the relationship-based data structure, the first term identified based at least in part on a weight of the first node;
    identifying a story that comprises the first term of interest and a second term of interest, wherein the second term of interest is represented by a second node, and wherein the story is identified based on a weight of an edge that connects the first node and the second node;
    detecting that the story is trending in the social media posts on the one or more social media platforms by identifying a change over time in the relationship-based data structure to the weight of the edge that connects the first node and the second node; and
    providing a user interface that presents the story, wherein the user interface is updated over time based on the change to the weight of the edge, and wherein the updated user interface indicates that the story is trending.

2. The computer-implemented method of claim 1, wherein identifying the first term of interest comprises:
    selecting a set of the terms by comparing the weights of the nodes to a threshold; and
    selecting the first term of interest from the set of the terms by comparing weights of edges associated with the set of the terms to another threshold.

3. The computer-implemented method of claim 1, wherein detecting the that the story is trending comprises detecting an increase in the weight of the edge that connects the first node and the second node.

4. The computer-implemented method of claim 1, further detecting that the story is losing interest of users of the one or more social media platforms based on the weight of the edge that connects the first node and the second node falling below a threshold.

5. The computer-implemented method of claim 1, wherein detecting that the story is trending further comprises detecting an increase to the weight of first node representing.

6. The computer-implemented method of claim 1, wherein a weight of a node representing a term is computed based on a frequency of occurrence of the term in the social media posts, a number of social media posts containing the terms, and a relevance of the social media posts containing the term.

7. The computer-implemented method of claim 1, wherein a weight of an edge connecting two nodes corresponding to two terms is computed based on a frequency of the two terms occurring together in the social media posts and a relevance of a story that comprises the two terms, wherein the relevance is based on a frequency of the story occurring in the social media posts.

8. The computer-implemented method of claim 1, wherein detecting that the story is trending comprises partitioning the relationship-based structure in a plurality of partitions, wherein nodes belonging to at least one partition represent trending terms of the story.

9. The computer-implemented method of claim 1, wherein detecting that the story is trending comprises partitioning the relationship-based structure in a plurality of partitions by:
taking snapshots of the relationship-based structure at time intervals;
updating the relationship-based structure based on additional social media posts accessed between the time intervals;
computing frequencies of occurrences of the terms between the time intervals;
generating, as a function of the time intervals, similarities between the terms based on the frequencies of occurrences; and
assigning the nodes to the partitions based on the similarities between the terms.

10. The computer-implemented method of claim 1, wherein detecting that the story is trending comprises partitioning the relationship-based structure in a plurality of partitions by:
taking snapshots of the relationship-based structure at time intervals;
updating the relationship-based structure based on additional social media posts accessed between the time intervals, the updating comprising increasing or decreasing weights of the edges based on co-occurrences of corresponding terms; and
assigning the nodes to the partitions based on the weights of the edges.

11. A computing system for analyzing social media posts regarding a story on one or more social media platforms, the computing system comprising:
a processor; and
a memory comprising computer-readable instructions that, when executed by the processor, cause the computing system to at least:
analyze occurrences of terms in the social media posts and co-occurrences of the terms in same social media posts to generate metrics associated with the terms over time;
update a graph data structure over time based on the metrics, the graph data structure comprising nodes representing the terms and edges connecting the nodes and representing co-occurrences of the terms, the nodes and edges being weighted based on the metrics, weights of the nodes being proportional to frequencies of the occurrences of the terms, and weights of the edges being proportional to frequencies of the co-occurrences;
select a set of the terms by comparing the weights of the nodes or the edges to a threshold, wherein the set of terms represents a set of terms of interest;
identify that the story is trending based on changes over time to the weights of nodes and edges corresponding to the set of terms, wherein the story comprises the set of terms of interest; and
provide a user interface that presents the story, wherein the user interface is updated over time based on the changes to the weights and wherein the updated user interface indicates that the story is trending.

12. The computing system of claim 11, wherein identifying the trend comprises detecting the changes to the weight at time intervals, wherein the time intervals are defined as a function of a volume of the plurality of social media posts.

13. The computing system of claim 11, wherein updates to the nodes and edges are tracked over time, wherein the trend of the story is identified based on the updates.

14. The computing system of claim 11, wherein updates to the weights of the nodes and edges are tracked over time, wherein a start, an end, and a relevance of the story are identified based on the updates.

15. The computing system of claim 11, wherein the social media posts comprises a plurality of posts received from the one or more social media platforms, wherein the updates are tracked by at least:
taking a snapshot of the graph data structure at a point in time;
receiving a post from a social media platform after the point in time;
analyzing occurrences and co-occurrences of terms of the post to determine changes to the weights of the nodes and edges; and
identifying the start, the end, or the relevance of the story based on the changes to the weights.

16. The computing system of claim 11, wherein the computer-readable instructions, when executed by the processor, further cause the computing system to at least:
track changes to the nodes or the edges over time by at least updating the metrics of the terms based on an analysis of social media posts received over time; and
detect whether an interest in the story is increasing or decreasing based on the changes over time.

17. A non-transitory computer-readable storage medium storing instructions for analyzing social media posts regarding a story on one or more social media platform, the instructions when executed on a computing device configure the computing device to perform operations comprising:
tracking occurrences of terms in the social media posts;
tracking co-occurrences of the terms in the social media posts by identifying terms that occur together in same social media posts;
updating a graph data structure over time based on metrics associated with the occurrences and co-occurrences, the graph data structure comprising nodes representing the terms and edges connecting the nodes and representing the co-occurrences of the terms, the nodes and the edges being weighted based on the metrics, weights of the nodes being proportional to frequencies of the occurrences of the terms, and weights of the edges being proportional to frequencies of the co-occurrences;
detecting that the story is trending based on changes over time to the weights of the nodes and the edges in the graph data structure; and
providing a user interface that presents the story, wherein the user interface is updated over time based on the change to the weights of the nodes and edges, and wherein the updated user interface indicates that the story is trending.

18. The non-transitory computer-readable storage medium of claim 17, wherein the instructions when executed on the computing device further configure the computing device to further perform operations comprising:
- taking snapshots of the graph data structure at time intervals;
- updating the graph data structure based on additional social media posts accessed between the time intervals;
- detecting changes to the graph data structure based on the snapshots; and
- detecting the trend of the story based on the changes to the graph data structure.

19. The non-transitory computer-readable storage medium of claim 17, wherein the story discusses an event, wherein the graph data structure is generated based on a type of the event, wherein when the type indicates a recurring event, a subset of the nodes and edges is predicted based on an output of a machine learning classifier, and wherein the machine learning classifier is trained based on past social media data associated with a past event.

20. The non-transitory computer-readable storage medium of claim 17, wherein the story discusses an event, wherein the instructions when executed on the computing device configure the computing device to present data about the story, and wherein the presented data identifies the event and the trend of the story.

\* \* \* \* \*